United States Patent [19]

Bory et al.

[11] Patent Number: 5,558,558

[45] Date of Patent: Sep. 24, 1996

[54] APPARATUS FOR RETRACTING A TOOL SLIDE OF AN ULTRASONIC CUTTING MACHINE

[75] Inventors: Michael Bory; Hans Bauer, both of Wattwil, Switzerland

[73] Assignee: Erosonic AG, Wattwil, Switzerland

[21] Appl. No.: 185,029

[22] Filed: Jan. 24, 1994

[30] Foreign Application Priority Data

Jan. 25, 1993 [CH] Switzerland ................. 203/93

[51] Int. Cl.⁶ ..................................... B24B 49/00
[52] U.S. Cl. ................... 451/11; 451/24; 451/27; 451/165
[58] Field of Search ................. 451/11, 12, 24, 451/26, 27, 165

[56] References Cited

U.S. PATENT DOCUMENTS

| 2,791,066 | 5/1957 | Mahlmeister . | |
|---|---|---|---|
| 2,942,383 | 6/1960 | Brown et al. . | |
| 3,094,814 | 6/1963 | Barke et al. . | |
| 3,614,484 | 10/1971 | Shoh | 451/165 |
| 4,524,543 | 6/1985 | Inoue | 451/165 |
| 4,934,103 | 6/1990 | Campergue et al. | 451/165 |

FOREIGN PATENT DOCUMENTS 2805429  8/1979  Germany .
3525330  1/1987  Germany .

OTHER PUBLICATIONS

Patent Abstracts of Japan, vol. 12, No. 105, (M–681) (2952) Apr. 6, 1988.

Primary Examiner—Bruce M. Kisliuk
Assistant Examiner—Eileen P. Morgan
Attorney, Agent, or Firm—Sughrue, Mion, Zinn, Macpeak & Seas

[57] ABSTRACT

A carriage 3 is movable in a feed direction A on guideways 1, and carries an ultrasonic machining device 4, 5 loaded with an adjustable force in the feed direction by a first fluid cylinder 7. A cylinder 15 is attached to the carriage, around which is looped 16 a rope 17. One end 18 of the rope is preloaded by spring 20 against a stop 21 which is attached to a frame 2. The other end 22 of the rope is attached to the piston rod 24 of a second cylinder 25. By means of the second cylinder the tool 5 can be lifted or retracted from the workpiece 6 during the machining operation, independently of the position of the carriage. After the tool has been lifted off, the tool touches down gently again on a renewed abrasive layer.

8 Claims, 2 Drawing Sheets

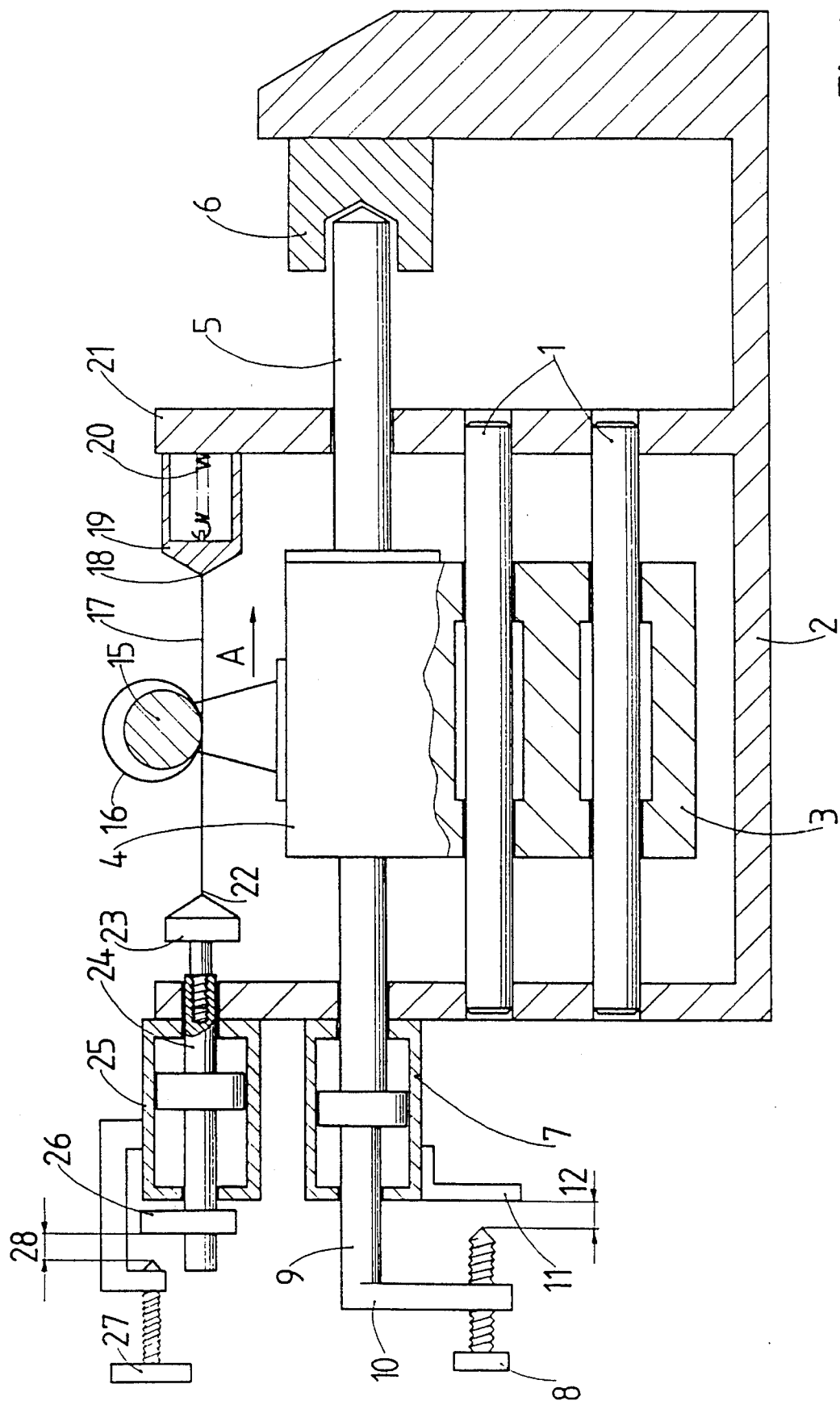

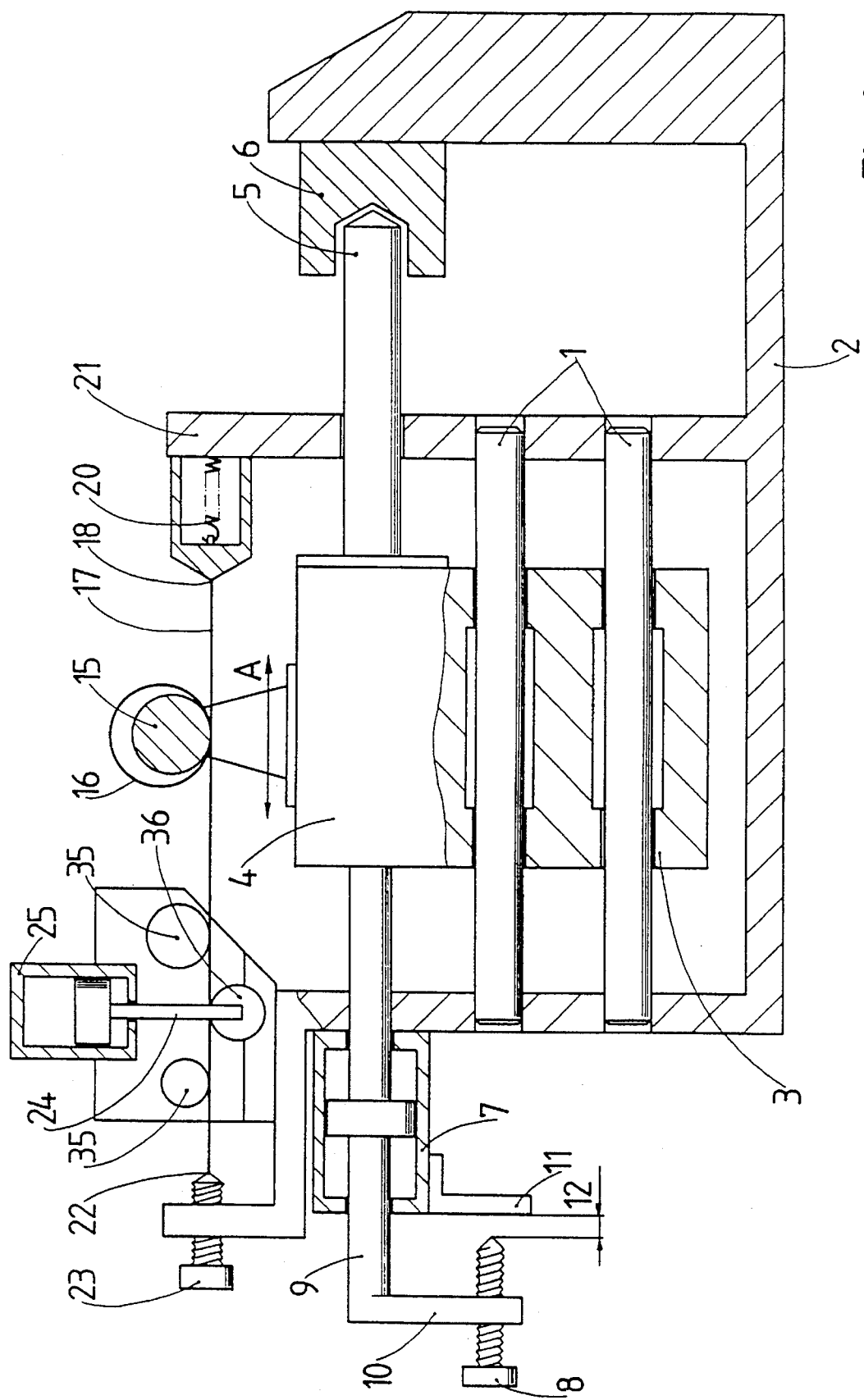

APPARATUS FOR RETRACTING A TOOL SLIDE OF AN ULTRASONIC CUTTING MACHINE

BACKGROUND OF THE INVENTION

The problem of deep drilling is sufficiently known in the metal cutting industry. Manufacturers of numerical control systems offer finished programs. Upon reaching the preprogrammed depth, the drill is retracted, according to the program, in order to remove the chips. Afterwards the drill returns to the already reached boring depth and continues the drilling operation. This procedure is possible when applied to metal cutting operations, because the machining parameters such as speed and rate of advance can be maintained.

The situation is different for ultrasonic erosion (see "Keramikbearbeitung", Carl Hauser Verlag, Munich 1989, pages 423 to 443). In this case the force feedback control guides the abrasion process. That is, the issue is not to retract at given depths but rather to adapt as optimally as possible to the actual process-related possibilities. The retraction of the sonotrodes should be possible at any time and at any arbitrary boring or sink depth, in order to increase the removal capacity. By unloading and lifting the sonotrodes, sharp new abrasive grains may be applied to the working area. This situation is especially important when no vacuum can be employed to activate the replacement of the abrasive grains.

Numerically controlled retracting cycles are not very suitable for this purpose. They are tied to position, and cannot be employed arbitrarily in time. They are complicated, because the already reached boring depth has to be stored. After one retracting cycle the tool returns automatically to the already bored depth. In so doing, an overload or shocks can occur, because during the retracting operation the borehole or recessed surface is covered with an abrasive compound.

SUMMARY OF THE INVENTION

The present invention is based on the problem of providing a device to pull back a tool slide of a machine tool that is also suitable for force-controlled feed drives.

BRIEF DESCRIPTION OF THE DRAWINGS

FIG. 1 is a diagrammatic longitudinal view of a machine tool according to the invention, and FIG. 2 is a view similar to FIG. 1, depicting a variant of the retracting device.

DETAILED DESCRIPTION OF THE PREFERRED EMBODIMENTS

Referring to FIG. 1, a carriage 3 can be moved on longitudinal guideways 1 of a machine frame 2. To the carriage 3 is attached an ultrasonic transducer 4, which sets a cutting tool 5 into longitudinal vibrations. The tool 5 vibrates in the direction of feed A and cuts a workpiece 6 clamped on the frame 2. The carriage 3 is loaded with an adjustable force $T_0$ in the direction of feed A by a pneumatic cylinder 7. The boring depth 12 can be adjusted by means of a screw 8, which is threaded through an arm 10 attached to the piston rod 9 and acts against a stop 11, which is attached to the cylinder housing.

Attached to the carriage 3 is a cylinder 15, whose axis runs perpendicularly to the direction of feed A. A loose loop 16 of a wire rope 17 or a spring steel wire is laid around the cylinder 15. The first end 18 of the rope 17 is attached to a block 19, which is pulled against a stop 21 mounted on the frame by a prestressed spring 20. The second end 22 of the rope is attached to a screw 23, which is threaded into the piston rod 24 of another pneumatic cylinder 25. To the piston rod 24 is attached an arm 26, which strikes against an adjustable stop screw 27 when the cylinder 25 is actuated. The stroke 28 of the piston rod 24 can be adjusted with the screw 27. Thus, the lifting or retraction stroke of the carriage 3 is roughly adjusted. The fine adjustment is done by means of the screw 23, with which the difference between the length of the loose loop 26 and the circumference of the cylinder 15 is adjusted. This difference is exaggerated in FIG. 1 and 2 for better illustration.

The prestress force of the spring 20 is adjusted such that upon actuating the cylinder 25, the rope friction between the loop 16 and the cylinder 15 suffices to overcome the feed power $T_0$.

In operation, during service the cylinder 7 is loaded with a selected pressure corresponding to the desired feed power. In the illustrated neutral position the cylinder 25 and thus the loop 16 are loose. The carriage 3 can move freely in the feed direction A, so that the tool 5 machines the workpiece 6.

If the tool 5 is to be lifted, the cylinder 25 is loaded, so that its piston rod 24 moves against the stop screw 27. In so doing, first the loop 16 is pulled tight and then the carriage 3 is taken along against the feed direction A. During the lifting operation, the abrasive emulsion is renewed in the borehole. When the cylinder 25 is subsequently unloaded or depressurized, the carriage 3 moves back (to the right) again and the tool 5 touches down gently with the adjusted feed power on the renewed abrasive emulsion. Thus, it does not gain by force the recessed depth that has already been reached.

The retraction operation can be activated at any arbitrary carriage position. Preferably the retractions are conducted at regular intervals, for example, under the control of a timing element. The length of the lift or stroke during the retraction operation is adjustable. When the tool engages the layer of abrasive compound, the feed power is not exceeded, since the tool touches down lightly on the workpiece covered with the layer of compound and does not gain by force the already reached recessed depth.

FIG. 2 shows a variation of the lifting element to retract the tool 5, where the approach and return accelerations are reduced when the tool 5 is lifted off and setsdown again. The rope 17 is guided over two rollers 35, which are mounted stationarily on the frame. The piston rod 24 is perpendicular to the direction of feed A, and carries another roller 36 with which the rope 17 is elevated between the two rollers 35.

In the embodiments according to FIGS. 1 and 2 the clamping element interacting with the second cylinder 25 is formed by means of the loop 16 and the cylinder 15. However, the clamping element for coupling the piston rod 24 with the carriage 3 in any arbitrary carriage position can be designed differently, e.g. as a pair of brake shoes, which can be moved with the piston rod 24 and which act against a track attached to the carriage 3, and which are lifted from the track in the neutral position of the piston rod 24, e.g. by means of a wedge attached stationarily to the housing. Of course, in both embodiments the retracting force excerted by the cylinder 25 on the rope 17 is greater than the sum of the force of piston 7 and spring 20.

We claim:

1. An apparatus for retracting a tool carriage (3) of an ultrasonic cutting machine, comprising:

a) a tool carriage slideably mounted on guideways (1) fixed to a frame (2), b) first drive means (7, 9) mounted on the frame and coupled directly to the carriage for feeding said carriage, and a cutting tool (5) carried thereby, in a first direction (A) to advance the tool against a workpiece (6), c) clamping means (15, 16) mounted to the carriage, and d) second drive means (24, 25) coupled to the clamping means for, in succession:
   1) actuating the clamping means to engage the carriage, and
   2) retracting the carriage, and the cutting tool, in a second, opposite direction against a force exerted on the carriage by the first drive means, e) wherein the clamping means comprises a driver (15) surrounded by a loop (16) formed by a flexible pull element (17) having a first end (18) preloaded against a stop (21) attached to the frame by a prestressed pull element (20), and a second end (22) attached to the second drive means.

2. An apparatus as claimed in claim 1, wherein the driver has a rounded contact surface for the pull element.

3. An apparatus as claimed in claim 1, wherein the pull element is one of a wire, a rope and a belt, and the loop formed thereby lifts off from the driver when the pull is loosened.

4. An apparatus as claimed in claim 1, wherein a loop angle of the pull element (17) around the driver (15) is at least 360°.

5. An apparatus as claimed in claim 1, wherein the second drive means (25) has gear means (35, 36) which reduces motion of the carriage when lifting the tool from and resetting it onto the workpiece.

6. An apparatus as claimed in claim 1, wherein a difference between a circumference of the loop and a circumference of the driver is adjustable.

7. An apparatus as claimed in claim 1, wherein the second drive means comprises two deflecting rollers (35) mounted stationarily on a housing, and a third deflecting roller (36) actuated by the second drive means (24) such that the pull element (17) runs over all three deflecting rollers.

8. An apparatus as claimed in claim 1, wherein in stroke of the second drive means is adjustable.

\* \* \* \* \*